United States Patent
Benecke et al.

(10) Patent No.: US 11,757,337 B2
(45) Date of Patent: Sep. 12, 2023

(54) ELECTRIC MACHINE WITH AN ELECTRICALLY CONDUCTING SHIELDING PLATE

(71) Applicant: Robert Bosch GmbH, Stuttgart (DE)

(72) Inventors: Jens Benecke, Buehl (DE); Bettina Straub, Buehl Eisental (DE); Dietrich Eckstein, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 17/405,679

(22) Filed: Aug. 18, 2021

(65) Prior Publication Data
US 2022/0060089 A1 Feb. 24, 2022

(30) Foreign Application Priority Data

Aug. 24, 2020 (DE) .......................... 102020210692.4

(51) Int. Cl.
| | | |
|---|---|---|
| *H02K 13/00* | (2006.01) | |
| *H02K 5/04* | (2006.01) | |
| *H02K 7/08* | (2006.01) | |
| *H02K 11/01* | (2016.01) | |
| *H02K 7/00* | (2006.01) | |

(52) U.S. Cl.
CPC .............. *H02K 13/006* (2013.01); *H02K 5/04* (2013.01); *H02K 7/003* (2013.01); *H02K 7/08* (2013.01); *H02K 11/01* (2016.01)

(58) Field of Classification Search
CPC ........ H02K 13/006; H02K 5/04; H02K 7/003; H02K 7/08; H02K 11/01; H02K 11/0141; H02K 5/148; H02K 5/145; H02K 11/026
See application file for complete search history.

(56) References Cited

U.S. PATENT DOCUMENTS

2016/0197538 A1* 7/2016 Takamura .............. H02K 11/40
310/71
2020/0178391 A1 6/2020 Kasuya et al.

FOREIGN PATENT DOCUMENTS

| DE | 3318362 A1 | 11/1984 |
|---|---|---|
| DE | 4225496 A1 | 2/1994 |
| DE | 102005055740 A1 | 6/2006 |
| DE | 102013001339 A1 | 7/2014 |

(Continued)

OTHER PUBLICATIONS

DE102013211601A1 English translation (Year: 2023).*
DE102018221859A1 English translation (Year: 2023).*

*Primary Examiner* — Christopher M Koehler
*Assistant Examiner* — Viswanathan Subramanian
(74) *Attorney, Agent, or Firm* — Michael Best & Friedrich LLP

(57) ABSTRACT

An electric machine (10), in particular for the adjustment of movable parts in the motor vehicle, includes a stator housing (22) which receives a stator (12) and a rotor (14), the rotor (14) having a rotor shaft (16), on which a commutator (18) is arranged and which can be energized by electric brushes (20), and the stator housing (22) having an axial opening (24), through which the rotor shaft (16) protrudes out of the stator housing (22), an electrically conducting shielding plate (29) being inserted axially between a brush holder plate (55) and a bearing plate (56) for the rotor shaft (16) in order to form a sandwich component (70), the sandwich component (70) extending transversely with respect to the rotor shaft (16) and covering substantially the entire opening (24).

18 Claims, 3 Drawing Sheets

(56) References Cited

FOREIGN PATENT DOCUMENTS

| | | | |
|---|---|---|---|
| DE | 102013211601 A1 * | 12/2014 | ........... H02K 11/022 |
| DE | 102015219865 A1 | 4/2017 | |
| DE | 102018221859 A1 * | 6/2020 | ............... H02K 1/17 |
| EP | 0258132 A1 | 3/1988 | |

* cited by examiner

ELECTRIC MACHINE WITH AN ELECTRICALLY CONDUCTING SHIELDING PLATE

BACKGROUND

The present invention relates to an electric machine with an electrically conducting shielding plate.

DE 42 25 496 A1 has disclosed an electric drive unit, in the case of which an intermediate frame is arranged between a pole pot and a transmission housing, into which intermediate frame a brush holder is integrated. Here, the drive unit is of modular construction, it being possible for a plug of separate configuration to be arranged at different positions on the drive unit. As a result, for example, different variants with or without an electronic housing can be realized, and, depending on the installation position of the drive unit, the plug connector can be adapted in accordance with the spatial conditions and the customer-specific mating plug. Here, the electronic housing with the electronic circuit board which is received therein is always arranged radially outside the pole housing. It is a disadvantage in the case of an embodiment of this type that the electronic circuit board with the different electronic components emits electromagnetic interference radiation (EMC) which can be disruptive for other electronic functions in the motor vehicle. Moreover, the brush contact also causes, in the intermediate frame, interference radiation which emits to the surroundings through the transmission housing which is made from plastic. This disadvantage is to be eliminated by way of the electric machine according to the invention.

SUMMARY

In contrast, the electric machine according to the invention has the advantage that the shielding plate is integrated in an optimum manner with a minimum amount of installation space into the brush holder and into the bearing plate by way of the configuration of the sandwich component. Here, the sandwich component can be preassembled with different variants of a shielding plate and, subsequently, can be inserted axially into the stator housing in one step. Here, the shielding plate can be attached to the rotor bearing by means of a large electric ground contact over the full surface area. Together with the shielding plate, the stator housing forms a Faraday cage which, as an EMC shielding means, shields the electromagnetic interference radiation which is produced to the outside. By way of the arrangement of the shielding plate transversely with respect to the rotor shaft radially as far as the flange of the stator housing, the carbon brushes and the electronic interference suppression components are shielded in an optimum manner as a result. An EMC shielding action can be achieved even for high frequencies up to, for example, 3 GHz by way of the optimum shielding effect of an electrically conducting continuous shielding plate of this type.

For energization of the electric motor, brush-holder brushes can be arranged on a brush holder plate which is fastened to the underside of the shielding plate. The brush holder plate is arranged, in particular, axially completely inside the stator housing. For the electric contacting of the brushes, they are connected, in particular welded, to contact elements of the current supply, for example, by means of flexible current braids. The brush carrier component is preferably configured from plastic, with the result that brush holders of the brushes can be formed directly in one piece thereon. For assembly, the brush holder component can be connected to the bearing plate through the central aperture in the shielding plate, the shielding plate being fastened axially between the said two components.

A bearing plate which has a bearing seat for the rotor bearing is fastened on the other side of the shielding plate so as to lie axially opposite the brush carrier plate. The rotor bearing is, in particular, of metallic configuration as a cylindrical or spherical bearing. The bearing plate can likewise be manufactured from plastic, but has an electrically conducting region around the bearing seat, which electrically conducting region connects the rotor bearing to the shielding plate over the full surface area.

The central aperture of the shielding plate is preferably shielded by means of a separately manufactured, electrically conducting adapter element which is braced axially firstly against the rotor bearing and secondly against the shielding plate. As a result, the entire opening of the stator housing from the metallic rotor shaft radially as far as the circumferential flange is completely sealed electromagnetically.

In order to configure an anti-rotation safeguard between the adapter element and the bearing plate, the outer circumference of the adapter element forms a positively locking connection to the bearing plate. For example, the adapter element has an approximately rectangular (in particular, square) outer circumference which engages into a corresponding receptacle in the bearing plate. Here, the adapter element bears with the said rectangular outer circumference axially in a conducting manner against the circumference of a corresponding central aperture in the shielding plate.

For the configuration of the mating contact with respect to the rotor bearing, a plurality of axial contact elements which bear in an axially sprung manner against the rotor bearing are configured around a bore in the adapter element. The entire axial opening of the stator housing is shielded tightly by way of the said ground contact over the full surface area of the adapter element and rotor bearing and with respect to the shielding plate. The receptacle for the adapter element is formed in the bearing plate for positioning and anti-rotation safeguarding, which receptacle has radial holding elements, for example a circumferential wall.

As an alternative to the adapter element, the bearing plate can have a conducting coating or integrated conducting particles, with the result that the bearing seat is of directly electrically conducting configuration, and forms a conducting connection over the full surface area with respect to the shielding plate. In the case of this embodiment, the central aperture can, for example, also be of round configuration, since no anti-rotation safeguard with respect to the adapter element is necessary. Here, a contact surface which bears axially against the circumference of the central aperture of the shielding plate is configured directly on the bearing plate in the region of the conducting coating.

For preassembly of the sandwich component, connecting elements engage through the central aperture of the shielding plate, in order that the conductor layer which conducts over the full surface area of the shielding plate is not interrupted. For example, latching elements and/or clamping elements can be integrally formed on the brush holder and/or on the bearing plate, which latching elements and/or clamping elements interact with mating latching elements and/or clamping elements of the bearing plate and/or the brush holder. As a result, the brush holder and the bearing plate with the shielding plate which lies in between are configured as a preassembled sandwich component. The said sandwich component is centered by means of the brush holder with respect to the stator housing, and is centered by means of the outer contour of the bearing seat of the bearing plate with respect to the transmission housing. Here, the shielding plate is preferably positioned by means of the latching or clamping elements within the central aperture in the sandwich component.

The brush holder component particularly preferably has a circumferential axial wall in a manner which lies radially opposite the circumferential wall of the stator housing. Centering elements are integrally formed on the said wall, which centering elements position the brush holder (and therefore the carbon brushes) correctly with respect to the commutator. The brush holder is connected axially to the bearing plate which is arranged axially on the opposite side of the shielding plate.

The shielding plate preferably bears without interruption over its entire circumference axially against the flange of the stator housing, with the result that a gap-free shielding cage can be realized on the circumference. In order that the shielding plate bears reliably over its entire circumference against the flange, the shielding plate has a radial overlap region with the flange. The said overlap region bears in a conducting manner against the flange. As a result, a sufficiently low-impedance and symmetrical attachment of the shielding means to the stator housing is ensured over the service life. In addition, the shielding plate can act as a load-bearing component, since it can be fixedly braced axially on the flange. As a result, for example, the brush carrier and/or the bearing plate can be fastened and positioned to/on the shielding plate. As a result, the electric motor is of very compact configuration and has a high mechanical stability. The shielding plate can be braced axially between the flange of the stator housing and a mating flange of the transmission housing in a very simple manner in the axial assembly method. Here, the transmission housing can be manufactured from plastic. For example, the two housing parts are connected to one another by means of screws or crimping or some other material reshaping.

The shielding plate can be integrated into an electronic circuit board in a particularly inexpensive manner, at least one continuously conducting conductor layer (preferably a copper layer) being configured in the insulating substrate of the electronic circuit board, on which conductor layer no defect is configured by way of the configuration of circuits or the attachment of electronic components. All of the modules and the contact elements for the brushes can advantageously be fitted on the electronic circuit board by means of inexpensive and robust SMD (Surface Mounted Devices) technology.

Continuously conducting conductor layers of this type can be manufactured as standard in the case of printed circuit board production, two conductor layers of this type which conduct over the full surface area preferably being arranged at the same time as axially inner layers, and the circuits and the electronic components being configured on two further outer conductor layers. Here, the at least one conductor layer which conducts over the full surface area is connected by means of axial plated-through holes to at least one axial side face of the printed circuit board which then bears axially in a conducting manner against the flange. The plated-through holes are particularly preferably arranged within the radial overlap region and, as a result, connect the electrically conducting overlap region on the underside to the conductor layer which conducts continuously over the full surface area in the interior of the electronic circuit board. In order to ensure sufficient EMC shielding, the spacings between the plated-through holes must not be too great in the circumferential direction. In particular, the said maximum distance between the plated through holes is at most 3 mm, as a result of which even high frequencies up to 3 GHz can also be shielded reliably.

The bearing seat is preferably configured in one piece with the bearing plate as an injection molded part. Here, the bearing seat is stabilized by means of integrally formed radial webs which at the same time also serve as centering elements for precise positioning of the bearing plate in the transmission housing. As a result, the rotor shaft is mounted at one end in the stator housing and in a middle region via the bearing plate in the transmission housing. The other end of the rotor shaft with the output element can additionally also be supported in the transmission housing.

If the shielding plate is configured as a metal sheet, it bears directly in a conducting manner on its outer circumference against the flange of the stator housing, and in a manner which lies opposite on the circumference of its central aperture against the bearing plate or against its adapter element. As a result, contacts which are continues over the full surface area are ensured in each case which form a reliable shielding means over the entire service life.

By way of the arrangement of the separately manufactured connector plug radially outside the pole housing, the plug-in direction and position of the corresponding customer-specific mating plug can be adapted very simply to the space conditions of the installation space, without the basic design of the brush holder plate or of the bearing plate or of the electronic circuit board being changed. By way of the configuration of a motor kit with a brush carrier component which is always unchanged, the variation of the electronic functions, such as, for example, the rotor position detection or the electronic interference suppression, can be moved exclusively into the electronic circuit board which is simpler to change and the at least one, continuous conductor layer over the full surface area of which is maintained in each case. By way of the unchanging stator housing interface, unchanging reliably satisfactory positioning of the brushes with respect to the commutator can therefore be ensured, and the electric motor can nevertheless be adapted to a very wide variety of customer requirements. Thus, even in the case of different variants of the electronic circuit board and/or the connector plug, the stator housing-electronic circuit board-transmission housing interface can always be of unchanging configuration, with the result that the flanges of the stator housing and of the transmission housing are always sealed reliably.

BRIEF DESCRIPTION OF THE DRAWINGS

The invention is described in greater detail in the following description on the basis of exemplary embodiments which are shown in the drawings, in which.

DETAILED DESCRIPTION

Figure 1:
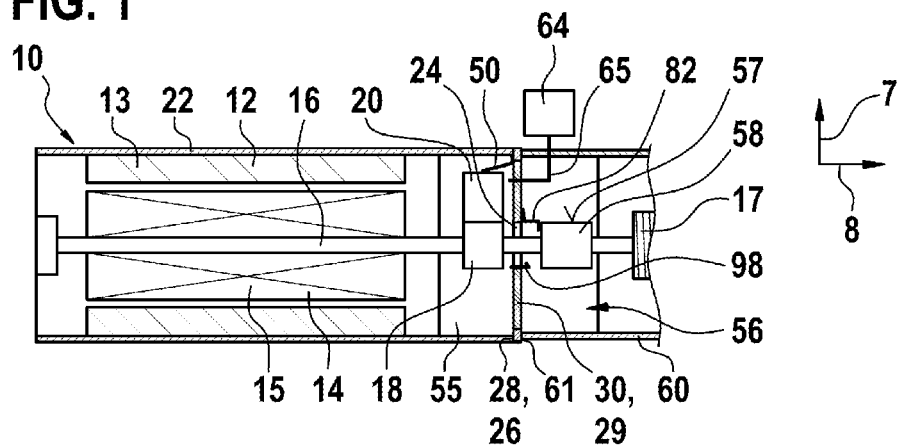
FIG. 1 shows an overall view of an electric machine in accordance with a first exemplary embodiment.

FIG. 1 shows an electric machine 10, as is used in the motor vehicle, for example, for the adjustment of movable parts, preferably window panes, sunroofs or seat components. Here, a stator 12 is arranged in a stator housing 22, within which stator 12 a rotor 14 is arranged, the rotor shaft 16 of which extends axially from the stator housing 22 into an axially adjoining transmission housing 60. The stator 14 preferably has permanent magnets 13 which drive an electric winding 15 of the rotor 14. Here, the drive torque is transmitted from the rotor shaft 16 to a transmission which is arranged in the transmission housing 60. Here, an output element 17 which interacts with other transmission components is arranged on the rotor shaft 16. As a result, for example, parts of a vehicle seat or a window pane in the motor vehicle are moved by means of a mechanism (not shown). A brush holder plate 55 is arranged between the pole housing 22 and the transmission housing 60 in the axial direction 8, which brush holder plate 55 receives electric brushes 20, for the electric contacting of a commutator 18 which is arranged on the rotor shaft 16. Here, the brushes 20 can be configured as hammer brushes or preferably as brush-holder brushes 28. The brush holder plate 55 is produced, for example, as a plastic component, and is preferably arranged radially completely inside the stator housing 22. A shielding plate 29 is arranged axially adjacently with respect to the brush holder plate 55 transversely with respect to the rotor shaft 16, which shielding plate 29 is configured, for example, as a metal sheet. The shielding plate 29 has a central aperture 32, through which the rotor shaft 16 protrudes. On its radially outer circumference, the shielding plate 29 bears in an electrically conducting manner against the stator housing 22. For example, a flange 28 is configured on an edge 26 of an axial opening 24 of the stator housing 22, against which flange 28 the shielding plate 29 bears in the axial direction 8. The shielding plate 29 has at least one conductor layer 36 which conducts over the full surface area and serves as a shielding plate for EMC radiation from the electric machine 10. In a manner which lies opposite the brush carrier plate 55, a bearing plate 56 is arranged on the other axial side of the shielding plate 29, which bearing plate 56 has a bearing seat 57 for a bearing component 58 of the rotor shaft 16. The bearing component 58 is configured, for example, as a cylindrical or spherical bearing from metal. Here, this bearing component 58 is connected in an electrically conducting manner to that conductor layer 36 of the shielding plate 29 which conducts over the full surface area. The bearing plate 56 is preferably connected axially to the brush holder plate 55 by means of clip elements or clamping elements 98, with the result that the shielding plate 29 forms a sandwich component 70 between the brush holder plate 55 and the bearing plate 56. Here, the extent of the shielding plate 29 in the radial direction 7 is preferably greater than that of the brush holder plate 55 and of the bearing plate 56. For example, the transmission housing 60 is connected to the stator housing 22 by means of connecting elements 66, as a result of which the shielding plate 29 is firmly braced and fixed between the stator housing 22 and the transmission housing 60.

Figure 2:
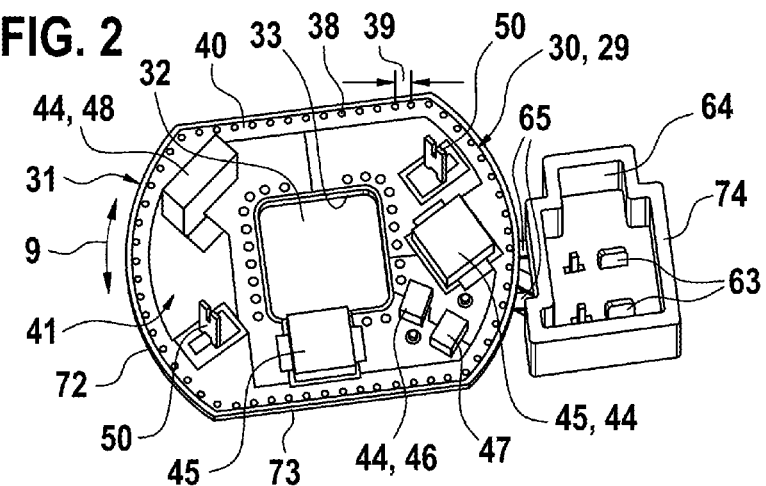
FIGS. 2 and 3 show a further exemplary embodiment of an electronic circuit board of an electric machine from below and from above.

FIG. 2 shows a further exemplary embodiment of an underside 41 of a shielding plate 29 which is configured as an electronic circuit board 30 and faces the stator 12 axially. Just like the stator housing 22, the electronic circuit board 30 has a flattened circular cross section, with the result that an outer circumference 31 of the electronic circuit board 30 has circular segment-shaped sections 72 and two parallel sections 73 which lie opposite one another. Here, the central aperture 32 for the rotor shaft 16 is configured approximately with a rectangular circumference 33, with the result that the latter can configure an anti-rotation safeguard for the sandwich component 70. At least two contact elements 50 for the electric brushes 20 are arranged on the underside 41, for example in a manner which lies diagonally opposite one another. An interference suppression choke 45 and/or a varistor 46 and/or a capacitor 47 and/or a thermal switch 48 are/is arranged as electronic modules 44 on the electronic circuit board 30. These modules 44 are all arranged on a region of the electronic circuit board 30, which region is arranged radially inside the opening 24. An electrically conducting overlap region 40 with the stator housing 22 is configured circumferentially on the underside 41 on the radially outer circumference 31, which overlap region 40 bears in a conducting manner against the flange 28. This conducting overlap region 40 is configured by way of a metallic coating on the insulating substrate 34, or by way of the removal of the outermost insulation layer, with the result that the outer conductor layer 35 of the electronic circuit board 30 is exposed on the underside 41. This outer overlap region 40 is connected electrically to the conductor layer 36 which conducts over the full surface area and is arranged in the interior of the electronic circuit board 30. In the exemplary embodiment, many individual plated-through holes (VIAS) 38 are configured distributed over the outer circumference, which plated-through holes 38 connect the overlap region 40 to the other conductor layers 35 of the electronic circuit board 30. Here, the spacing 39 between the plated-through holes 39 is at most 3 mm, in order that sufficient EMC shielding is available. The connector plug 64 is arranged radially next to the electronic circuit board 30, which connector plug 64 is configured here as a component which is manufactured separately from the electronic circuit board 30. The connector plug 64 is connected to the electronic circuit board 30 by means of conductor elements 65, the one ends of which form connector pins 63 for the current supply. The opposite ends of the conductor elements 65 are guided by means of current leadthroughs 67 from the upper side 42 through the electronic circuit board 30 to its underside 41. On the underside 41, the conductor elements 65 are connected in each case via the interference suppression chokes 45 to the contact elements 50 for the brushes 20. The connector plug 64 has a plug collar 74, within which the connector pins 63 for electric contacting of the electric machine 10 are arranged. In the exemplary embodiment of FIG. 1, the plug collar 74 with the connector pins 63 extends in the axial direction 8, with the result that a corresponding plug can likewise be pushed in the axial direction 8 into the plug collar 74. The modules 44 and the contact elements 50 for the brushes 20 are all configured here as SMD components, with the result that the electronic circuit board can be populated completely by means of a single Surface Mounted Devices (SMD) soldering process.

Figure 3:
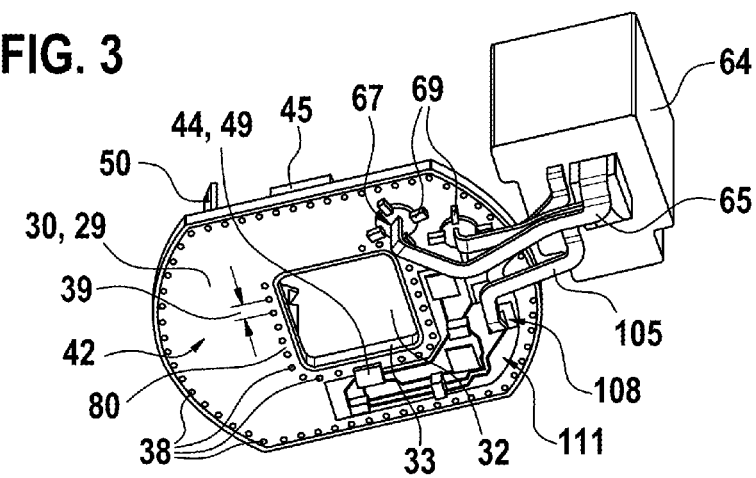

FIG. 3 shows an upper side 42, lying axially opposite the underside 41, of the shielding plate 29 which is configured as an electronic circuit board 30, which upper side 42 faces the transmission housing 60. An electrically conducting ground contact region 80 which is connected in an assembly to the bearing component 58 is on this upper side 42 over the circumference around the central aperture 31. Like the overlap region 40 on the underside 41, this ground contact region 80 is also configured, for example, by way of a metallic coating on the insulating substrate 34, or by way of the removal of the outermost insulation layer, with the result that the outer conductor layer 35 of the electronic circuit board 30 is exposed on the upper side 42. The ground contact region 80 is also connected electrically to the other conductor layers 35 and, in particular, to the inner conductor layer 36 which is configured in a conducting manner over the full surface area, by means of individual plated-through holes (VIAS) 38 which are arranged distributed over the circumference of the central aperture 31. The individual plated-through holes (VIAS) 38 on the overlap region 40 and on the ground contact region 80 are of continuous configuration axially through the entire electronic circuit board 30, with the result that they extend in each case from the underside 41 as far as the upper side 42. The conductor elements 65 for the attachment of the connector plug 64 are connected from the upper side 42 to the electronic circuit board 30 as current leadthroughs 67 for the current supply of the brushes 20. In order to ensure electric EMC shielding in the region of the current leadthrough 67 through the electronic circuit board 30, in each case four CY capacitors 69 are arranged on the upper side 42 around the current leadthroughs 67, which CY capacitors 69 point away from the current leadthrough 67 in a star-shaped manner. The CY capacitors 69 are connected electrically to the conductor layer 36 which conducts over the full surface area and also contacts the stator housing 22 and the bearing component 58 electrically. In addition to the conductor elements 65, signal lines 105 are also routed from the connector plug 64 to the upper side 42 of the electronic circuit board 30, where they are connected to the magnetic sensor 49. To this end, the ends of the signal lines 105 are contacted with contact pads 108 on the upper side 42, which contact pads 108 are part of the circuitry arrangement 89 for the magnetic sensor 49.

Figure 4:
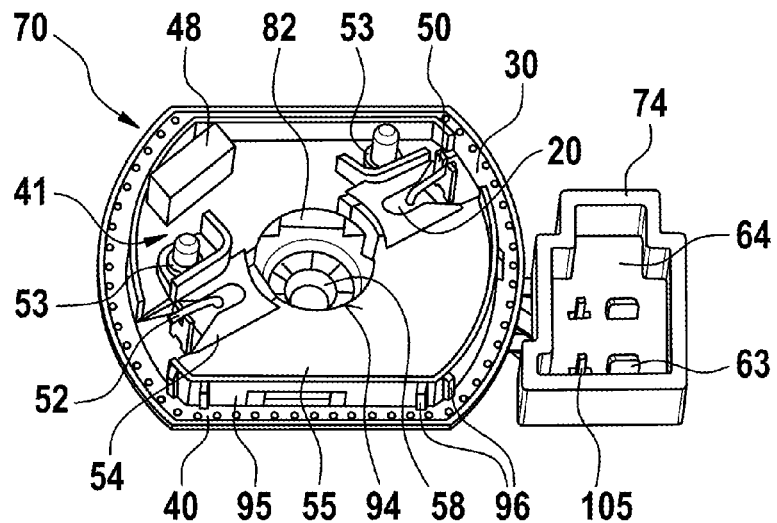
FIGS. 4 and 5 show the exemplary embodiment according to FIGS. 2 and 3 with an assembled sandwich component from below and from above.

FIG. 4 shows an embodiment of a sandwich component 70, in the case of which, in the view of the underside 41 of the shielding plate 29 according to FIG. 2, the brush holder plate 55 and the bearing plate 56 are assembled. Holders 54 which receive the electric brushes 20 are formed on the brush holder plate 55. The brushes 20 in each case have a braid 52, which braids 52 are connected, for example welded, electrically to the contact elements 50 for the brushes 20. The contact elements 50 are configured as tabs which project axially from the electronic circuit board 30 and engage axially through corresponding holes in the brush holder plate 55. In order to press on the brushes 20 radially, press-on springs 53 which bear with a spring arm against that side of the brush 20 which faces away from the commutator 18 are arranged on the brush holder plate 55. The thermal switch 48 engages axially through a cutout in the brush holder plate 55, and extends toward the rotor 14. On its outer circumference, the brush holder plate 55 has a circumferential wall 95 which extends in the axial direction 8. Positioning elements 96 are integrally formed on the said circumferential wall 95, by means of which positioning elements 96 the brush holder plate 55 is centered in the stator housing 22. The brush holder plate 55 is then inserted axially completely into the stator housing 22. The overlap region 44 of the electronic circuit board 30 protrudes radially beyond the brush holder plate 55, with the result that the overlap region bears in an electrically contacting manner against the flange 28 of the stator housing 22 during the insertion of the sandwich component 70. The bearing component 58 which is received in the bearing plate 56 can be seen through a central through opening 94 in the brush holder plate 55. Here, an electrically conducting adapter element 82 is clamped in axially between the bearing component 58 and the ground contact region 80 of the electronic circuit board 30 for the ground attachment of the bearing component 58.

Figure 5:
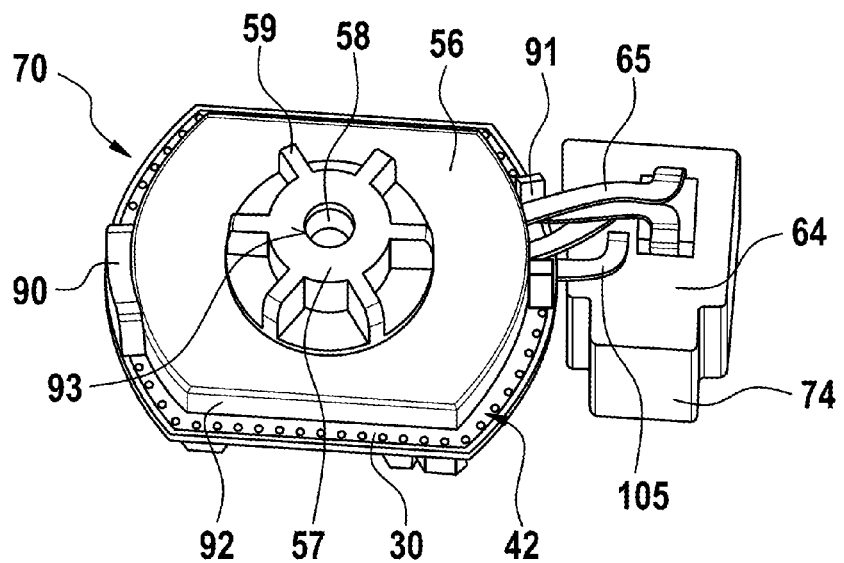

FIG. 5 shows the sandwich component 70 from FIG. 4 with a view of the upper side 42 of the shielding plate 29 with an assembled bearing plate 56. The bearing component 58 is inserted into the bearing seat 57 of the bearing plate 65. The bearing plate 56 also has a central through hole 93, through which the rotor shaft 16 protrudes into the transmission housing 60. Support is carried out on the rear side of the bearing seat 57 on the bearing plate 56 by means of radial webs 59 which optionally also bring about the centering of the bearing plate 56 in the transmission housing 60. The bearing plate 56 also has a circumferential wall 92 which has a radial leadthrough 91 for the conductor elements 65. The electronic circuit board 30 also protrudes at its upper side 42 radially beyond the bearing plate 56. On this radial overhang, the transmission housing 60 bears axially against the electronic circuit board 30, in order to press the latter in an axially conducting manner against the flange 28. Furthermore, the wall 92 has a radial projection 90 which is configured as a covering for a radial opening in the transmission housing 60 when the sandwich component 70 is assembled in a manner which is rotated by 180°, in order to position the connector plug 64 on the opposite side. At the same time, this radial projection 90 also forms an anti-rotation safeguard together with the corresponding opening on the transmission housing 60.

Figure 6:
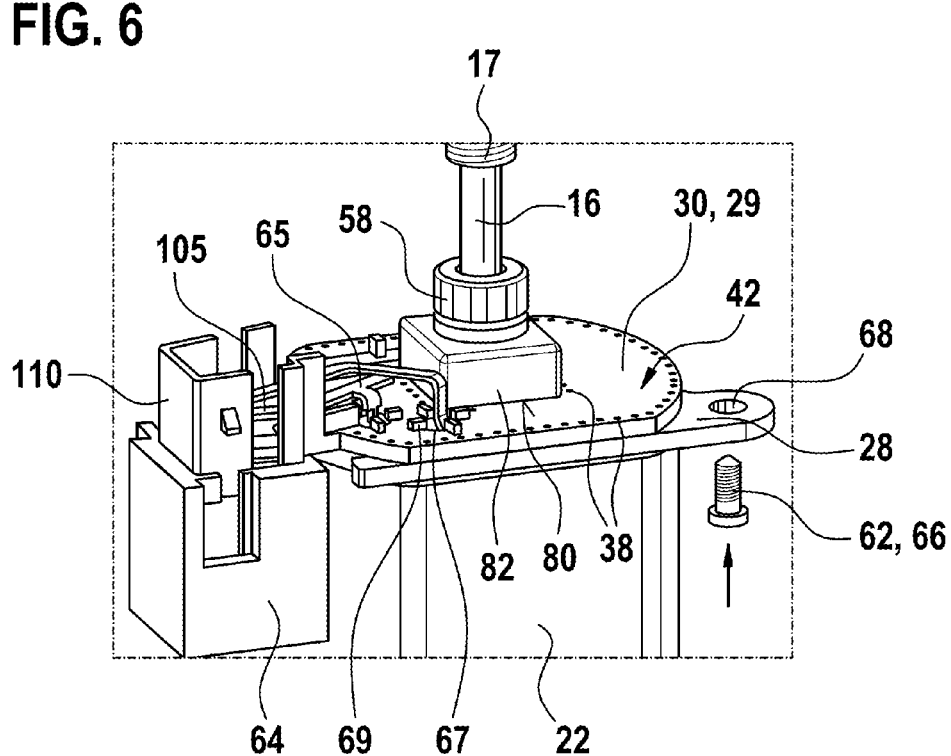
FIG. 6 shows a further embodiment of an electronic circuit board which is mounted on the stator housing.

FIG. 6 diagrammatically shows how the brush holder plate 55 is inserted with the shielding plate 29 into the stator housing 60. The overlap region 40 of the underside 41 bears in an electrically conducting manner against the flange 28. On the upper side 42, the adapter element 82 bears axially against the ground contact region 80 around the central aperture 32. The bearing component 58 without a bearing plate 56 is also shown diagrammatically, which bearing component 58 in turn bears axially in a conducting manner against the adapter element 82. Therefore, both the bearing component 58 and the stator housing 22 are connected in an electrically conducting manner to that conductor layer 36 of the electronic circuit board 30 which conducts over the full surface area. Here, the adapter element 82 is also configured from an electrically conducting material, for example metal, in order to shield the central through opening 32 of the electronic circuit board 30 against EMC. In this exemplary embodiment, screw-on eyelets 68 are formed on the flange 28, through which screw-on eyelets 68 screws 62 are preferably inserted as connecting elements 66 into the transmission housing 60. The connector plug 65 is connected to the stator housing 22 and the transmission housing 60, for example, by means of a connecting part 110, in which the conductor elements 65 and the signal lines 105 are routed.

Figure 7:
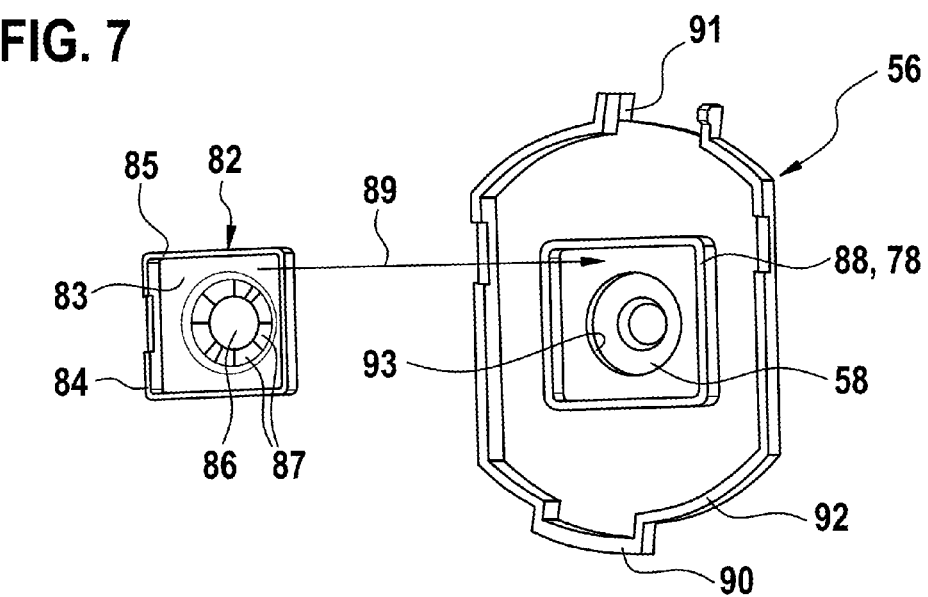
FIG. 7 shows a further exemplary embodiment of a two-piece bearing plate.

FIG. 7 shows how the separately produced adapter element 82 is inserted into the bearing plate 56. In the case of this embodiment, both the central aperture 32 in the shielding plate 29 and also correspondingly the ground contact region 80 are of approximately rectangular configuration. The adapter element 82 likewise has an approximately rectangular base area 83 with a rectangular circumferential wall 84 which is formed integrally on it in the axial direction 8 and the end side 85 of which is pressed axially against the ground contact region 80. The adapter element 82 likewise has a central bore 86 for the rotor shaft 16. Axial spring elements 87 which are pressed axially against the bearing component 58 are configured on the circumference of this bore 86. The bearing component 58 is seated fixedly in the bearing seat 57 which can be configured from plastic in the case of this embodiment. The conducting adapter element 82 is then braced axially between the ground contact region 80 and the bearing component 58. A receptacle 88 is integrally formed on the bearing plate 56 around its bearing seat 57, into which receptacle 88 the adapter element 82 is inserted axially. Here, the receptacle 88 has radial holding elements 78 which are configured, for example, as a circumferential wall. Since the outer circumference of the adapter element 82 is rectangular in the case of this embodiment, the receptacle 88 has a corresponding rectangular cross section, with the result that the adapter element 82 is guided radially therein. At the same time, the rectangular positively locking connection 89 between the adapter element 82 and the receptacle 88 represents an anti-rotation safeguard 89 for the adapter element 82. The adapter element 82 can be manufactured, for example, as a stamped bent part from sheet metal, whereas the bearing plate 56 is manufactured as a plastic injection molded part. The radial leadthroughs 91 for the conductor elements 65 to the connector plug 64 are again configured on the wall 92 of the bearing plate 56. Furthermore, the wall 92 has a radial projection 90 which is configured as a covering for a radial opening in the transmission housing when the sandwich component 70 is assembled in a manner which is rotated by 180°, in order to position the connector plug 64 on the opposite side. At the same time, this radial projection 90 also forms an anti-rotation safeguard together with the corresponding opening on the transmission housing 60. Together with that conductor layer 36 of the electronic circuit board 30 which conducts over the full surface area, the conducting base area 83 forms EMC shielding which covers the entire opening 24 of the stator housing 22.

In one alternative embodiment (not shown) of the bearing plate 56, the adapter element 82 is integrated in one piece into the bearing plate 56. Here, the bearing seat 57 and the region between the bearing seat 57 and the ground contact region 80 are of electrically conducting configuration. For example, this region is coated metallically, or plastic with integrated conductive particles is used. A bearing plate 56 of this type is preferably produced by means of a two-component injection molding method, in the case of which the surface of the bearing seat 57 and the region between the bearing seat 57 and the ground contact region 80 are configured by means of an electrically conductive component.

It is to be noted that the specific shape of the stator housing 22, of the transmission housing 60 and of the connector plug 64 which is shown in the figures can be adapted to the corresponding application of the electric machine 10. The electronic circuit board 30 can also, for example, receive different electronic components 44 depending on the requirement. The configuration of the printed electronic circuit board 30 can likewise be varied and can be configured, for example, with fewer than or more than four conductor layers 35, at least one conductor layer 36 which is conducting over the full surface area being arranged. The central aperture 32 can also have a cross section which differs from a rectangular shape. The electric contacting of the overlap region 40 and/or the ground contact region 82 can be realized, for example, by means of a metallic coating of the electronic circuit board 30 or an exposure of a conductor layer 35 of the electronic circuit board 30. The outer circumference of the sandwich component (70) can also have a real circular shape or any desired outer contour instead of a flattened circle. Instead of an electronic circuit board 30, the shielding plate 29 can also be configured as a metal sheet which bears at its radially outer edge 31 against the flange 28.

What is claimed is:

1. An electric machine (10) comprising a stator housing (22) which receives a stator (12) and a rotor (14), the rotor (14) having a rotor shaft (16), on which a commutator (18) is arranged and which can be energized by electric brushes (20), and the stator housing (22) having an axial opening (24), through which the rotor shaft (16) protrudes out of the stator housing (22), an electrically conducting shielding plate (29) being inserted axially and sandwiched between a brush holder plate (55) and a bearing plate (56) for the rotor shaft (16) in order to form a sandwich component (70), the sandwich component (70) extending transversely with respect to the rotor shaft (16) and covering substantially the entire opening (24), and wherein the bearing plate (56) is connected axially to the brush holder plate (55) by clip elements or clamping elements such that the shielding plate (29) forms the sandwich component (70) between the brush holder plate (55) and the bearing plate (56).

2. The electric machine (10) according to claim 1, wherein the brush holder plate (55) has a central through opening (94) for the rotor shaft (16), and brush holders (54) for receiving electric brushes (20) are configured on the brush holder plate (55), which brush holders (54) bear radially against the commutator (18), and the brushes (20) are contacted electrically by braids (52).

3. The electric machine (10) according to claim 1, wherein the bearing plate (56) is manufactured from plastic and has a central bearing seat (57) for receiving a bearing component (58) which is configured as a cylindrical or spherical bearing and is connected in an electrically conducting manner to the shielding plate (29).

4. The electric machine (10) according to claim 3, wherein the bearing component (58) is connected in a conducting manner to the shielding plate (29) by a separately manufactured, electrically conducting adapter element (82), and the adapter element (82) shields a central aperture (32) in the shielding plate (29) electromagnetically.

5. The electric machine (10) according to claim 4, wherein the central aperture (32) of the shielding plate (29) and the adapter element (82) have approximately a rectangular cross section, and the adapter element (82) bears in a conducting manner axially against the shielding plate (29) on a circumference of the central aperture (32).

6. The electric machine (10) according to claim 4, wherein the bearing plate (56) has radial holding elements (78) as a receptacle (88) for the adapter element (82), and the adapter element (82) is supported axially directly on the bearing component (58) by way of axial spring elements (87) which are arranged around a central bore (86) in the adapter element (82).

7. The electric machine (10) according to claim 4, wherein the brush holder plate (55) is connected axially to the bearing plate (56) by the clip or the clamping elements (98) which protrude through the central aperture (32) and provide the electrically conducting axial bracing between the bearing component (58) and the shielding plate (29).

8. The electric machine (10) according to claim 3, wherein the bearing plate (56) has, in the region around the bearing component (58), a coating that is connected directly in an electrically conducting manner to the shielding plate (29).

9. The electric machine (10) according to claim 3, wherein the bearing seat (57) is supported on the bearing plate (56) by integrally formed radial webs (59) which at the same time center the bearing plate (56) with respect to a transmission housing (60).

10. The electric machine (10) according to claim 1, wherein radial positioning elements (96) are configured on a radial circumferential contour (95) of the brush holder plate (55), which positioning elements (96) are supported radially on the stator housing (22), in order to center a position of the brushes (20) with respect to the commutator (18).

11. The electric machine (10) according to claim 1, wherein a radial extent of the shielding plate (29) over its entire circumference is greater than a radial extent of the brush holder plate (55) and of the bearing plate (56), and the shielding plate (29) bears in a conducting manner on its outer circumference (31) axially against a flange (28) around the opening (24) of the stator housing (22), and wherein a transmission housing (60) with a counter flange (61) bears against the shielding plate (29) axially opposite the stator housing (22).

12. The electric machine (10) according to claim 11, wherein an underside (41) of the shielding plate (29), which underside (41) faces the flange (28), bears over its entire radially outer circumference (31) axially against the flange (28) of the stator housing (22), in order to electrically contact the latter, and the shielding plate (29) has an axial conductor face (80) on an upper side (42) of the shielding plate (29), which upper side (42) faces away from the flange (28), over an entire circumference (33) of a central aperture (32) of the shielding plate (29), in order to electrically contact the bearing component (58) via the axial conductor face (80).

13. The electric machine (10) according to claim 11, wherein the transmission housing (60) is screwed to the stator housing (22).

14. The electric machine (10) according to claim 1, wherein the shielding plate (29) includes an electronic circuit board (PCB) (30) which is-populated with at least one interference suppression element (44) and electric contact elements (50) for the brushes (20).

15. The electric machine (10) according to claim 14, wherein the electronic circuit board (30) is connected by conductor elements (65) to a separately manufactured connector plug (64) which is arranged completely radially outside the stator housing (22).

16. The electric machine (10) according to claim 15, wherein a radial leadthrough (91) for the conductor elements (65) is formed in the bearing plate (56).

17. The electric machine (10) according to claim 14, wherein the electric contact elements (50) are fitted on the electronic circuit board by SMD (Surface Mounted Devices) technology.

18. The electric machine (10) according to claim 1, wherein the electric machine is for the adjustment of movable parts in a motor vehicle.

\* \* \* \* \*